Figure 1:
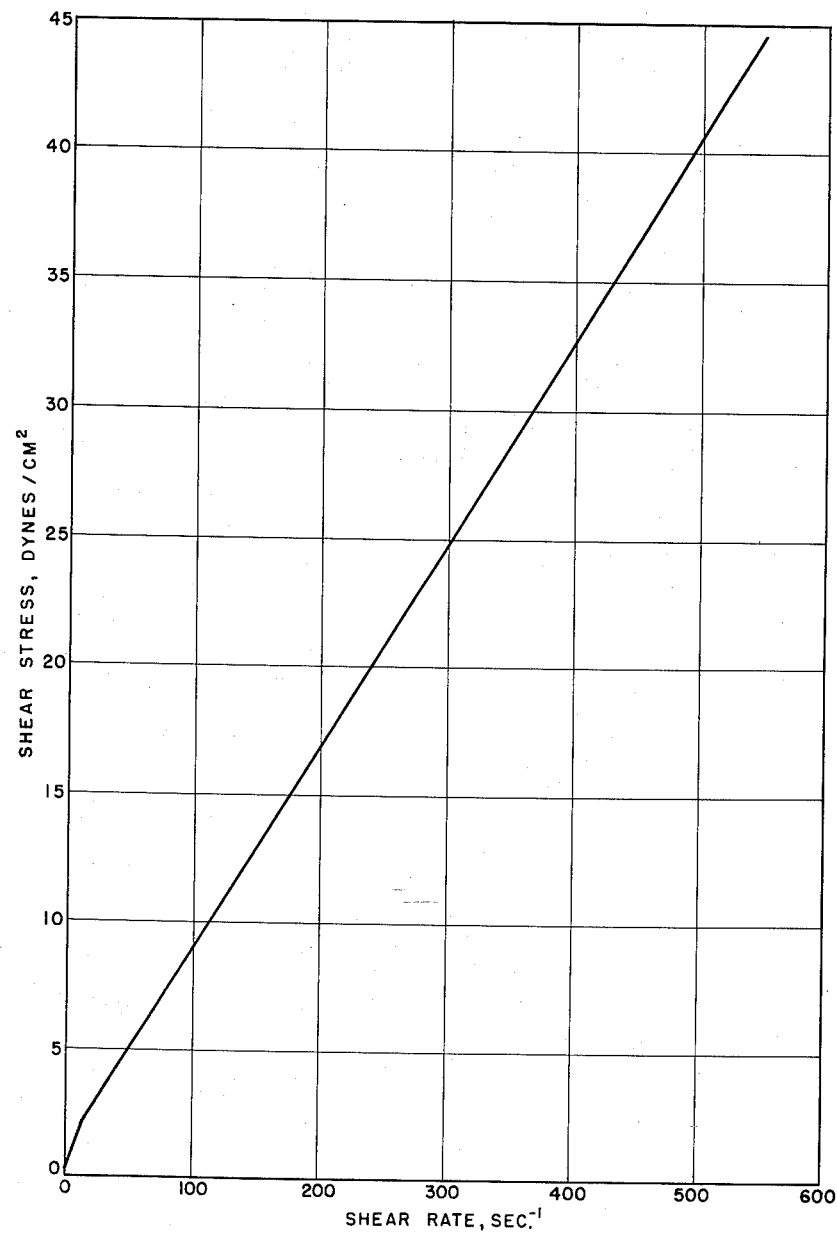

FIG. I.

INVENTORS.
MORRIS R. MORROW,
JOSEPH A. SNYDER,
LUTHER D. HOWELL, SR.
BY Frank S. Troidl
ATTORNEY.

3,065,171
TREATMENT OF WELLS
Morris R. Morrow, Baytown, Joseph A. Snyder, La Porte, and Luther D. Howell, Sr., Baytown, Tex., assignors, by mesne assignments, to Jersey Production Research Company, Tulsa, Okla., a corporation of Delaware
Filed Feb. 5, 1959, Ser. No. 791,363
2 Claims. (Cl. 252—8.55)

This invention relates to operations performed in wells. More particularly, this invention relates to the treatment of fluids such as hydraulic fracturing fluids used in fracturing subsurface formations to increase or initiate the production of oil from the fractured formations.

If a well has oil to produce and sufficient reservoir pressure to flow the oil to any fractures, additional oil can be produced as a result of fracturing.

Well fracturing is the splitting of rock by pressure. Hydraulic pressure applied to the rock of the well bore creates compressive forces around the hole. When these forces become great enough, they force the rock apart and start the split which is lengthened by the fluid pumped into the hole.

A good fracturing fluid must have among other things the following characteristics: (1) It must be fluid enough to be easily pumped by the usual well completion pumps. (2) It must be capable of holding a propping material, such as sand, in suspension while being pumped down the well, but it also must be capable of depositing the propping material in the cracks of the formation. (3) It must flow into the cracks in the formation, but there should be a minimum of fluid loss into the pores. (4) It must not plug the pores of the formation permanently or the capacity of the formation to produce oil will be damaged.

Some lease oils and some refined crudes, without the addition of agents thereto, possess enough of the desired characteristics to permit their use as fracturing fluids under some conditions. Some oils do not cause serious damage to the formation. However, in order to use these lease oils and refined crude oils, the pump rates necessary to keep the sand or other propping material in suspension must be very high. These high pump rates are often impossible because of the limitations of available pumping units. This is particularly so when pumping through tubing or small diameter casing. Such tubing and small diameter casing is found in various kinds of wells, as for example, the permanent well completion-type well wherein a tubular member is permanently placed within the well with its lower extremity located above the bottom of the well. Thus, most oils require the addition of one or more agents to achieve the desired results.

A good fracturing fluid must be easily pumped down the well, as formerly explained. A good fracturing fluid must also be capable of holding a propping material such as sand in suspension while being pumped down the well. This fracturing fluid must deposit the sand in the cracks of the formation to hold the cracks open. In general, the higher the viscosity of the fracturing fluid, the better the fluid for purposes of sand suspension. The higher viscosity fracturing fluids tend to hold the sand in suspension as the fracturing fluid is pumped into the well. The reason for holding the sand in suspension is to prevent the sand from settling into the bottom portion of the resulting fracture. Also, a good sand suspending fracturing fluid prevents the sand from bridging across the fracture. If no bridging of the sand occurs or the sand does not settle to the bottom of the fracture, a longer fracture is obtained and a better propping of the fracture. Unfortunately, however, if a high viscosity fracturing fluid is used because of its better sand suspension and antibridging capacity, the power requirements of the pumps is higher than the power requirement of the pumps if a low viscosity fluid is used. With high viscosity fracturing fluids, the effective power at the depth at which fracturing is to be made is much less than the input power at the wellhead. With low viscosity fracturing fluids, the effective power at the place of fracture is substantially the same as the input power at the wellhead. This feature is highly important when it is understood that the pressure required to make a fracture in the formations having oil is approximately one pound per square inch for each foot of depth. Hence, if a fracture is to be made at a depth of ten thousand feet or greater, the effective power at the place of fracture must be at least about ten thousand pounds per square inch.

A good agent for a fracturing fluid provides a low resistance to flow as the fluid is being pumped into the well and thus acts as a low viscosity fluid and yet provides sufficient strength to hold the propping material, such as sand, in suspension as the fluid is being pumped into the well and the fracture, thus acting in this capacity as a high viscosity fracturing fluid.

In addition to being easily pumpable and capable of holding the propping material in suspension, a good fracturing fluid must also flow into the cracks as they are formed, but must not flow into the pores. Flow into the pores of the fracture results in wasted fluid since high fluid loss into the pores leaves less fluid available for extending the fracture. A low fluid loss into the pores leaves more fluid available for extending the fracture. The longer and more extensive the fractures, the greater will be the productive capacity of the well when returned to production.

A still further requirement is that the pores must not be plugged permanently or the capacity of the formation to produce oil, when the well is returned to production, will be damaged. Damage to the formation may be caused, for example, by including minute solid particles in an agent or using an agent with a very high gel strength. These solid particles are much smaller than the propping material; in fact, they enter the pores and many remain in the pores after the fracture has been completed, thus preventing subsequent flow of oil through the pores when the well is returned to production with consequent permanent damage to the producing capacity of the formation. An agent having or which imparts to the fracturing fluid a very high gel strength will cause damage to the formation because the fluid will not be displaced from capillaries having less than a certain critical diameter. The higher the gel strength, the greater this critical diameter. Thus, with a high gel strength, more capillaries retain the fracturing fluid than with a low gel strength. Thus, a good fracturing fluid should have extremely little or no gel strength. A gel strength of less than about one dyne/cm.$^2$ is satisfactory.

Each of the agents currently used in fracturing fluids impart certain undesirable properties to the fluid. One currently utilized agent, for example, includes oil-insoluble solids, which are dispersed in a metal soap oil dispersion. As formerly stated, inclusion of minute solids may cause damage to the fractured formation.

Other currently used agents employ a surface active material which forms a gelatinous precipitate in the presence of a small amount of water. Also, the surface active material, since it requires the addition of water, is hydrous. Water boils at 212° F. The temperatures found within deep wells often are much higher than this, often much higher than 250° F. Hence, the requirement of water seriously limits the extent of usefulness of such an agent.

Other currently used agents having a metal soap dispersed in oil suffer from the disadvantages of changing phase at high temperatures causing the soap to be contaminated by moisture. These agents also include plastering materials such as blown asphalt or pitch. The inclusion of such plastering materials requires that a solvent, such as carbon tetrachloride or carbon bisulfide, be flowed down the well after the fracturing has been completed to dissolve the plastering material for removal. These plastering materials also cause damage to the formation which cannot be remedied, even by use of a solvent.

The fracturing fluid of this invention possesses none of the undesirable features heretofore mentioned but instead possesses the desirable properties heretofore described.

Wherever the following terms are used in this specification and the appended claims:

(1) "Salt-soap complex" means a chemical species formed by heating a salt and a soap to high temperatures, under required conditions for forming the chemical species. The required temperature for forming the chemical species varies somewhat according to the particular kind of salt and/or soap used. However, this required temperature is generally in the range of from 250° to 600° F. The heating is usually done under pressure. The resulting complex is different from a simple physical mixture of the salt and the soap. This difference can be shown by X-ray diffraction patterns.

(2) "Calcium salt-calcium soap complex" means a chemical species formed by heating calcium salt and calcium soap to high temperatures, under the required conditions for forming the chemical species. For example, a calcium acetate-calcium soap mixture is generally heated to at least 400° F. to form the complex. This can be shown by X-ray diffraction data.

(3) "Compound" means a material comprising a dispersion of a salt-soap complex in an oil base. The compound may be formed either by adding the preformed salt-soap complex to the oil or by heating a mixture of the salt and the soap and the oil base to the high temperature necessary to form the salt-soap complex which becomes dispersed in the oil base. The resulting compound may be fluid, semi-fluid, or greasy in structure.

(4) "Concentrate" means a fluid composition including the compound, as defined above, and a petroleum oil, mixed until the compound is completely dispersed in the oil. The concentrate, when added to fluids used in fracturing wells, imparts desired characteristics to the fluids so used.

Briefly described, our invention comprises but is not limited to a fracturing fluid which contains an organic metal salt-metal soap complex. The fracturing fluid is forced into the well bore under pressure and contacts the faces of the subsurface formations exposed to the well bore. The complex may be added to the fluid used in fracturing wells as a portion of a "compound," or as a portion of a "concentrate."

We have found through extensive study and tests that a highly superior fracturing fluid results from the inclusion of the organic metal salt-metal soap complex. The fracturing fluid has all of the desired qualities described above. When not being pumped, our new fracturing fluid has a slight gel strength. Nevertheless, the fluid is easily pumped and practically all of the power from the pump is transmitted as effective power to the location in the hole at which the fracturing is to be made. Also, because of the very low gel strength, no damage is done to the formation as would be the case if a high gel strength fluid were used.

This new fracturing fluid is very effective in holding sand in suspension as it is being pumped down the well and into the cracks formed by the fracturing operation. Thus, bridging and falling out of the sand is substantially eliminated. If pumping is stopped, the sand is still held in suspension.

The fracturing fluid of this invention freely flows into the fractures but does not permanently plug the pores. It is theorized that the complex acts in the nature of a mat which temporarily blocks the pores but does no damage to the pores. Its fibrous structure mats about the pores and prevents fluid from being lost into the pores. The pores are temporarily blocked without requiring the addition of minute solid particles which would cause damage to the formation.

The new fracturing fluid also has the very desirable quality of being easily removed from the fracture after the fracturing operation is completed. The pumps are stopped and the pressure of the formation unblocks the pores and flows the fracturing fluid up to the surface. Hence, the addition of a solvent or gel breaker is unnecessary when our new fracturing fluid is used.

The inclusion in the fracturing fluid of an organic metal salt-metal soap complex imparts very high temperature stability to the fracturing fluid. No phase changes occur as the temperature is raised. The complex extends the range of utility of the fracturing fluid from below 200° F. to above 500° F. Thus, the addition of "reinforcing agents" or plastering materials is unnecessary.

The organic metal salt-metal soap complex is substantially anhydrous. It is effective in the anhydrous state in the fracturing fluid. Since no water is required to render it effective, its usefulness is not limited by the volatility of water.

Figure 2:
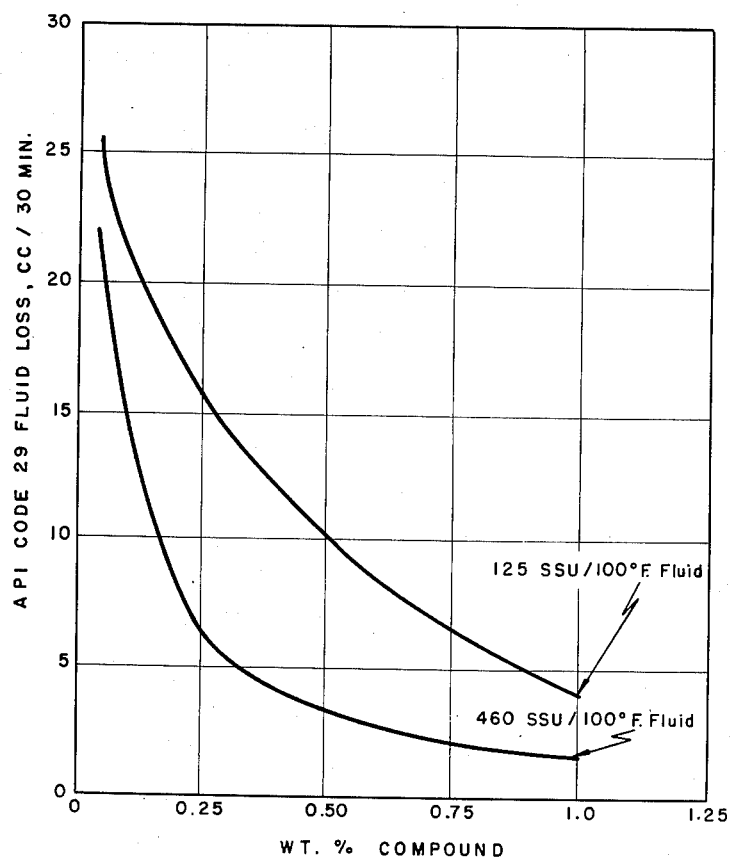

The invention as well as its many advantages may be further understood by reference to the following detailed description and drawings in which:

FIG. 1 is a graphical representation showing the characteristic behavior of a crude oil including a compound having calcium salt-calcium soap complexes; and FIG. 2 is a graphical representation of fluid loss as a function of the percentage by weight of a compound having calcium salt-calcium soap complexes in fracturing fluids of different viscosities.

The metals used in forming the salt-soap complexes are preferably selected from the alkaline earth metals, barium, calcium, and strontium. However, aluminum, beryllium, zinc, cadmium, boron, tin, zirconium, cerium, vanadium, antimony, bismuth, arsenic, copper, molybdenum, germanium, columbium, chromium, selenium, tellurium, tungsten, manganese, iron, cobalt, or nickel may be used under particular circumstances. The complexes are not limited to those containing a single metal, but, instead, a given complex may contain two or more of the above-listed metals. The salt and the soap may be formed of the same metal or the salt may be formed from one metal and the soap from another metal.

In forming these salt-soap complexes, a saponifiable material, usually a high molecular weight organic acid, is used. The saponfiable materials which contain high molecular weight organic acids may include fatty acids, either in a combined or a free state, tallow, lard, oil, hog fat, horse fat, stearic acid, oleic acid, higher molecular weight acids resulting from the oxidation of petroleum fractions, rosin, and related products, higher molecular weight naphthenic acids, sulfonic acids, and saponifiable waxes, such as beeswax, sperm oil, degras, etc. Irrespective of the source of the high molecular weight organic acid used as the soap portion of the complex, the said organic acid should contain not less than 7 carbon atoms per molecule and not more than about 30 carbon atoms per molecule, and preferably contain between 8 and 18 carbon atoms per molecule.

The salts useful in forming these complexes are preferably simple reaction products resulting from the combination of an organic acid of a relatively low molecular weight with a metal oxide or metal hydroxide. Suitable organic acids of low molecular weight whose salts may be employed for formation of complexes include monocarboxylic and polycarboxylic acids containing less than seven carbon atoms per molecule. Included in this group are formic, acetic, propionic, butyric, valeric, oxalic, malonic, succinic, the low molecular weight alkyl and arylsulfonic acids, the low molecular weight carboxylic acids such as glyceric, glycolic, and thioglycolic.

The salt-soap complex employed in this invention can be formed by heating to high temperatures if the proper ratios of the various ingredients are used according to the type of metal and acids and other materials used in forming the complex. A number of procedures are possible for the manufacture of salt-soap complexes. One procedure consists of reacting the desired saponifiable material with an amount of basically reacting metal oxide or hydroxide equal to that required to react with both the saponifiable material and the acid whose salt is desired in the complex. After the saponification is complete, the required amount of low molecular weight acid is added and heated to a temperature in the range of 250° to 600° F. to cause the formation of the complex. The above steps may take place in the presence of a portion of a mineral oil. The final product is not just a simple physical mixture of a salt and a soap, but rather a combination of the salt and the soap occurs which forms a chemical species entirely different from that of a mere physical combination. The particular temperature within the aforementioned range to which the reaction mixture must be heated in order to form the complex is dependent upon the specific components present in the mixture.

The preferred salt-soap complex employed in this invention is a calcium acetate-calcium soap complex. This preferred complex was prepared in a mineral oil distillate in the following manner using the components listed below in the amounts shown.

Ingredients: Weight percent

Glacial acetic acid_____ 10.0
    Hydrofol acid 51_____ 5.0
    Hydrated lime_____ 7.3
    Naphthenic-type mineral oil distillate having a
      viscosity of 55 SSU at 250° F_____ 77.7

The hydrofol acid (hydrogenated fish oil acids corresponding to commercial stearic acid in degree of saturation) and hydrated lime and all of the mineral oil were charged to a fire-heated kettle equipped with agitated means and the mixture was heated to about 130° F. The glacial acetic acid was then added. Heating was continued and the temperature was raised to 500° F. to form the complex. The temperature was raised to 500° F. to assure the formation of the complex. Usually, a temperature of at least 400° F. is necessary for the complex formation. After reaching a temperature of 500° F., heating was discontinued and the compound was cooled to 200° F. while stirring. Thereafter, the compound was homogenized at a high rate of shear in a Gaulin homogenizer. The properties of the finished product were:

Mole ratio—acetic:hydrofol acid_____ 9.3:1
Free acidity as oleic acid_____ 0.14
Dropping point, ° F_____ 500+
Water solubility_____ Insoluble The evidence for the formation of a new complex soap structure is based on X-ray diffraction data. These data show that the characteristic X-ray diffraction lines for both calcium soap and calcium acetate disappear during the course of manufacture of the compound having the ingredients and proportions shown above. Table I shows the characteristic X-ray diffraction lines for calcium soap and the characteristic X-ray diffraction lines for calcium acetate. Table I also shows that the characteristic X-ray diffraction lines for calcium soap and calcium acetate disappear during the forming of the compound. A new set of diffraction lines characteristic of the complex is formed.

TABLE I

*Characteristic X-Ray Diffraction Lines of Simple and Complex Calcium Soaps*

|  | Characteristic X-ray diffraction lines (A.) | | | | | | |
|---|---|---|---|---|---|---|---|
|  | 16.9 | 12.4 | 11.5 | 9.5 | 9.0 | 8.3 | 7.9 |
| Calcium stearate ($C_{18}$) soap | + | | | | | | |
| Calcium acetate | | | + | | | + | |
| Calcium stearate ($C_{18}$) soap-calcium acetate complex | | | | + | + | + | |

It is clear from Table I that the X-ray diffraction lines of the complex show that a different chemical entity is formed, namely, a complex soap, rather than a simple mixture of the calcium soap and the calcium acetate.

The calcium soap included in the formation of the compound is preferably made using stearic acid having 18 carbon atoms per molecule. Carboxylic acids containing from 8 to 10 carbon atoms per molecule are also very effective. Suitable complexes can be formed over a rather wide ratio range of calcium acetate to calcium soap. As a matter of fact, the mole ratio can vary from 1/1 to 15/1, the particular ratio depending to some extent upon the particular number of carbon atoms per molecule in the acid used in forming the soap. For example, a 10/1 ratio forms an effective complex when using a soap having 18 carbon atoms whereas a ratio of 5/1 is effective using soaps having 8 to 10 carbons.

The percentage by weight of complex present in the compound varies somewhat according to the particular metals, acids, etc. used in the preparation of the compound. For example, in preparing a compound from acetic acid, a higher carboxylic acid, hydrated lime, and a naphthenic-type mineral oil distillate, the amounts of each ingredient used is such that the resulting compound contains complexes ranging from 5 to 30% by weight of the compound. If stearic acid is used as the higher carboxylic acid, the preferred range is from about 5 to 20%.

The mineral oil charged to the fire-heated kettle is preferably a naphthenic-type mineral oil or aromatic oil having a viscosity of less than 75 SSU at 210° F. which acts as a dispersant for the complexes. However, a paraffinic oil may be used if desired. Synthetic oils may be used including di-esters, complex esters, silicone oils, etc. The amount of oil may range between 40% to 80% by weight of the compound.

The addition of the compound comprising calcium acetate-calcium soap complexes dispersed in mineral oil such as the one prepared as described above, to a fracturing fluid, with the compound being in the range by weight of 0.01 to 5% of the resulting fluid yields outstanding results in the fracturing of oil wells. This means the complex ranges from .0005 to 1.5% by weight of the resulting fluid. The fracturing fluid thus prepared has all of the requirements of a good fracturing fluid. It acts as a low viscosity fluid while being pumped so that the effective power at the place of fracture is substantially the same as the power input at the wellhead; it holds sand in suspension while the fluid is being pumped down the well and deposits the sand in the cracks of the formations; it flows into the cracks of the formation, but not through the pores, that is, has a low fluid loss. It temporarily plugs the pores of the formation but is washed from the pores by the produced oil when the well is produced. Because this fluid is easily washed from the pores, no solvent is needed. Also, no damage is done to the formation.

Table II illustrates the low fluid loss and low sand falling rate of a refined oil having a viscosity of 145 SSU/100° F. to which was added various percentages of a compound containing about 20% complex. A fluid loss of less than thirty cc. for a thirty minute period is considered very good. Notice that even with as little as 0.05 weight percent of the compound or about 0.01 weight perecnt of the calcium salt-calcium soap complex added to the refined oil, a fluid loss of only 22 cc. in thirty minutes is obtained.

TABLE II

| Weight percent calcium acetate-calcium soap compound | 0 | 0.05 | 0.125 | 0.25 | 0.5 | 1.0 | 4.0 |
|---|---|---|---|---|---|---|---|
| Fluid loss, cc. in 30 minutes | [1] 120 | 22 | 13 | 6 | 2 | 4 | 4 |
| Sand falling rate, ft./min | | | 2.9 | | | | |

[1] In 2 minutes.

FIG. 1 illustrates the low gel strength of a 34 API crude oil with a compound made in accordance with the previously described procedure and having calcium salt-calcium soap complexes. At 0 shear rate, the fluid, as shown by FIG. 1, has a shear stress (gel strength) of 0.2 dyne/cm.$^2$. Because of this low gel strength, when the fracturing fluid is used to fracture a formation, no damage occurs to the formation. This is so because the fracturing fluid does not permanently plug the small diameter capillaries in the formation. If for any reason the pumps should stop or become inoperative, the fracturing fluid will thicken sufficiently to suspend the sand particles or other propping materials because of the small amount of gel strength it possesses. FIG. 1 also illustrates that with the application of a slight shear rate by the starting of the pumps, the fracturing fluid acts like a low viscosity oil. The viscosity remains substantially constant with increasing pumping rates.

Fluid loss and other tests were made on fracturing fluids, including the compound. The A.P.I. Code No. 29, Fourth Edition, May 1957, was used as a criterion of effectiveness.

The base stocks used include, but are not restricted to, crude oils, residua, bright stocks, lubricant distillates, raffinates, middle distillates, and extracts, and related refining by-product streams.

Table III compares the fluid loss for a thirty minute period of various API gravity crudes without the addition of the compound and with a small portion, 0.1 pound per gallon, or approximately 1.2 weight percent of a calcium salt-calcium soap type compound. It can be seen that the fluid loss is cut drastically in all of the crudes when the compound is added to the crude.

The effective concentration of a compound containing about 20% by weight calcium salt-calcium soap complexes was investigated over the range of 0.05 to 4.0 weight percent. Four fluids, which were refined oils ranging in viscosity from 120 SSU/100° F. to 460 SSU/100° F., were used in the evaluation. The data obtained in this phase of the study are given in Table IV and two of the series of tests (1 through 5 and 44 through 50) are plotted in FIG. 2. Since the goal in fluid loss is a maximum of 30 cc. in thirty minutes, 0.05 weight percent would be sufficient with the stocks used in this study. If a crude were being used as a fracturing fluid, the data recorded in Table III would indicate that as much as 0.1 weight percent of the compound might be required. This amounts to 0.02 weight percent of the complex.

TABLE IV

| Test No. | 1 | 2 | 3 | 4 | 5 | 6 | 20 | 21 | 16 | 17 |
|---|---|---|---|---|---|---|---|---|---|---|
| Fluid, SSU/100° F | 460 | 460 | 460 | 460 | 460 | 460 | 345 | 345 | 240 | 240 |
| Compound: | | | | | | | | | | |
| Amt., Weight Percent | 0.05 | 0.125 | 0.25 | 0.50 | 1.0 | 4.0 | 0.125 | 0.20 | 0.1 | 0.2 |
| Lb./gal | 0.004 | 0.010 | 0.021 | 0.041 | 0.083 | 0.332 | 0.010 | 0.016 | 0.008 | 0.016 |
| Mixing (Waring Blendor) time, min | 2 | 2 | 2 | 2 | 2 | 2 | 2 | 2 | 2 | 2 |
| API Code 29 F.L.: | | | | | | | | | | |
| Temp. ° F | 100 | 100 | 100 | 100 | 100 | 100 | 100 | 100 | 100 | 100 |
| Rate, cc./30 min | 22 | 13 | 6 | 2 | 3 | 4 | 25 | 16 | 19 | 6 |
| Sand falling rate, ft./min | | 2.9 | | | | | | | 3.5 | |

| Test No. | 44 | 45 | 46 | 28 | 29 | 49 | 47 | 50 | 48 |
|---|---|---|---|---|---|---|---|---|---|
| Fluid, SSU/100° F | 145 | 145 | 145 | 145 | 145 | 145 | 145 | 145 | 145 |
| Compound: | | | | | | | | | |
| Amt., Weight Percent | 0.05 | 0.1 | 0.2 | 0.2 | 0.2 | 0.35 | 0.5 | 0.75 | 1.0 |
| Lb./gal | 0.004 | 0.008 | 0.016 | 0.016 | 0.016 | 0.029 | 0.041 | 0.062 | 0.083 |
| Mixing (Waring Blendor) time, min | 2 | 2 | 2 | 2 | 2 | 2 | 2 | 2 | 2 |
| API Code 29 F.L.: | | | | | | | | | |
| Temp. ° F | 100 | 100 | 100 | 100 | 100 | 100 | 100 | 100 | 100 |
| Rate, cc./30 min | 29/22 | 22 | 14 | 22 | 15 | 13 | 12/12 | 6 | 4 |

Two test runs are recorded in Table V. An extract from a paraffinic crude in column 1 is compared to an extract from a naphthenic crude in column 2. This comparison shows no difference in the reaction of these stocks to the calcium salt-calcium soap complex in mineral oil.

TABLE V

| Fluid, SSU/100° F | 450 | 460 |
|---|---|---|
| Compound amount:[1] | | |
| Weight percent | 0.2 | 0.2 |
| Lb./gal | 0.016 | 0.016 |
| Mixing: | | |
| Type | [2] | [2] |
| Time, min | 2 | 2 |
| API Code 29 F.L.: | | |
| Temp., ° F | 100 | 100 |
| Rate, cc./30 min | 10 | 8 |

[1] Calcium salt-calcium soap complex in mineral oil.
[2] Waring Blendor.

The organic metal salt-metal soap complexes are usually dispersed in a naphthenic-type mineral oil. However, the complexes can be dispersed in other petroleum fluids. The resulting compound can be made to vary in fluidity from a very fluid compound to a highly viscous compound by those skilled in the art. The compound is substantially anhydrous and has high temperature stability and viscosity stability. The compound may not be in convenient form for use in the field particularly if it is highly viscous. Hence, a feature of the invention described

TABLE III

| | Concentration[1] pounds/gallon | 34° API crude | 36.4° API crude | 32.8° API crude | 21.6° API crude | 25.3° API crude |
|---|---|---|---|---|---|---|
| None | 0.0 | 250 cc./30 sec | 250 cc./22 sec | 250 cc./21 sec | 250 cc./28 sec | 250 cc./25 sec. |
| Calcium salt-calcium soap compound | 0.1 | 11.4 | 6.4 | 3.1 | 1.8 | 1.3 |

[1] 0.1 lb./gal.≅1.2 weight percent.

herein is a composition used as a "concentrate" and includes at least the compound and a petroleum oil to provide a "concentrate" which has a desired fluidity for use in the field. The amount of compound used is sufficient to provide the desired fluidity upon mixing. The compound is mixed with the petroleum oil, such as a crude oil or refined oil, until the desired fluidity is obtained. The compound is added to the petroleum oil in a concentration of from 5 to 50% by weight of the concentrate and the mixture stirred rapidly. A concentration in the range of 25 to 30% is preferred. This means the amount of complex ranges from .25 to 15.0% by weight of the concentrate with 1.25 to 9.00% being preferred. Here again, the preferred compound is a calcium acetate-calcium soap complex dispersed in a naphthenic-type mineral oil. However, it is to be understood tested in the API Fluid Loss Test with a phenol extract, as shown by test 69 in Table VI. In this test, the concentrate and extract were mixed by hand shaking, rather than the Waring Blendor. In tests 70 and 71, the amount of the compound was reduced to 0.30 and 0.12, respectively. A ten gallon batch of the fluid concentrate was prepared in a thirty gallon blendor. Tests 73 and 74 prove that the material is of satisfactory quality and that mixing by hand shaking is adequate. Four barrels of 30% compound and 70% of a phenol extract concentrate were blended in a drum with mixing accomplished by means of an air stirrer and circulation with a centrifugal pump. Each of these drums was tested using 1.0 weight percent of the compound, and mixed sweet crude. These were tests 75 through 78, and the results were considered excellent.

TABLE VI

| Test No. | 69 | 70 | 71 | 72 | 73 | 74 | 75 | 76 | 77 | 78 | 79 | 80 |
|---|---|---|---|---|---|---|---|---|---|---|---|---|
| Fluid | | | | | | | | | | | | |
| SSU/100° F. | 145 | 145 | 145 | 145 | 145 | 145 | 49 | 49 | 49 | 49 | 49 | 49 |
| Concentrate | Phenol extract | | | | 30% compound in phenol extract | | | | | | Mixed sweet crude | |
| Amt., weight percent [1] | 0.6 | 0.3 | 0.12 | 0.12 | 0.2 | 0.2 | 1.0 | 1.0 | 1.0 | 1.0 | 0.75 | 0.50 |
| Lb./gal | 0.048 | 0.024 | 0.010 | 0.010 | 0.016 | 0.016 | 0.083 | 0.083 | 0.083 | 0.083 | 0.062 | 0.041 |
| Mixing: | | | | | | | | | | | | |
| Type | Hand shaking | | | W.B. | Hand | W.B. | Waring Blendor | | | | | |
| Time, min. | 1 | 1 | 1 | 2 | 1 | 2 | 2 | 2 | 2 | 2 | 2 | 2 |
| API Code 29 F.L.: | | | | | | | | | | | | |
| Temp., °F. | 82 | 82 | 82 | 100 | 82 | 100 | 100 | 100 | 100 | 100 | 100 | 100 |
| Rate, cc./30 min | 5 | 7.5 | 10 | 9 | 16 | 18 | 8 | 10 | 8 | 10 | 11 | 14 |

[1] Based on compound-fluid concentrate is 30% compound, 70% phenol extract by weight.

that compounds including other salt-soap complexes can be used effectively.

The petroleum oil used in preparing the concentrate is preferably a distillate or a fraction from a distillate, such as a distillate extract. Its viscosity should be in the range of 100 to 1000 SSU/100° F. The preferred oil is a phenol extract of a distillate from coastal crude. Its viscosity is about 145 SSU/100° F. Mixing can be accomplished by a simple mixing in a drum with a Lightnin mixer, by circulating with a pump, or by means of a colloidal mill.

The mixture of the compound and the petroleum oil forming the concentrate having the desired fluidity, can be placed in containers, such as cans suitable for holding fluid. Our new fluid concentrate for use in well operations can then be added when desired to a lease crude at the well site or to refined oils or other fracturing fluids which have been transported to the well site. For example, the fluid concentrate described above may be used by mixing the required amount into the fracturing fluid to be employed. The amount of concentrate used is preferably such that the final concentration of the compound in the fracturing fluid is in the range of 0.01 to 1.0% by weight of the fracturing fluid which means the salt-soap complex is present in the fracturing fluid in an amount in the range of .0005 to .3% by weight of fracturing fluid. Up to 5% by weight of compound in the fracturing fluid can be used, the increased percentage giving desired characteristics to the fluid. It has been found however, that the addition of more than 5% compound gives no appreciable improved results. The actual amount required depends upon the fluid being used and can be initially determined by a laboratory test. The test used for this evaluation is the A.P.I. Code No. 29, Fourth Edition, May 1957, Fluid Loss Test.

A concentrate comprising thirty weight percent of a compound including calcium salt-calcium soap complexes dispersed in a naphthenic-type mineral oil and 70% of a phenol extract having a viscosity of 145 SSU/100° F. was prepared in a glass flask with a paddle stirrer at room temperature. The compound included about 20% by weight of complexes. After two hours stirring, the blend appeared to be homogeneous. The material was Tests 79 and 80 tried reduced amounts of the compound and confirmed the previous findings.

We claim:

1. In a process of working a well wherein a petroleum oil is forced into the well bore under pressure, the method of treating subsurface formations traversed by the well bore against loss of appreciable amounts of said oil to the formations, which comprises incorporating in said oil organic metal salt-metal soap complexes, said complexes ranging from .0005 to 1.5% by weight of the petroleum oil and contacting the faces of the subsurface formations exposed to the well bore with said oil having said complexes incorporated therein.

2. A method of treating a well to increase the productivity of a formation penetrated by the well which comprises pumping a low-penetrating liquid into said well including said formation, said low-penetrating liquid including a propping material and calcium acetate-calcium soap complexes, said complexes ranging from .0005 to 1.5% by weight of the low-penetrating liquid applying pressure against said formation until a formation breakdown pressure is reached causing a fracture in the formation, continuing to apply pressure to displace low-penetrating fluid into the pores of said formation and place propping material in the fracture, and thereafter producing said well, whereby said liquid is removed from said pores.

References Cited in the file of this patent

UNITED STATES PATENTS

| | | |
|---|---|---|
| 2,417,428 | McLennan | Mar. 18, 1947 |
| 2,417,429 | McLennan | Mar. 18, 1947 |
| 2,618,596 | Minich | Nov. 18, 1952 |
| 2,846,392 | Morway | Aug. 5, 1958 |
| 2,914,476 | Alderman et al. | Nov. 24, 1959 |
| 2,946,748 | Steiner et al. | July 26, 1960 |

OTHER REFERENCES

Kalichevsky: Modern Methods of Refining Lubricating Oils, published, 1938, by Reinhold Publ. Co. of N.Y., pages 93, 95, 96 and 163 to 166.